(12) United States Patent
Líu et al.

(10) Patent No.: US 12,115,673 B2
(45) Date of Patent: Oct. 15, 2024

(54) ROBOT OBSTACLE AVOIDANCE METHOD, COMPUTER READABLE STORAGE MEDIUM, AND ROBOT

(71) Applicant: UBTECH ROBOTICS CORP LTD., Shenzhen (CN)

(72) Inventors: Yizhang Líu, Shenzhen (CN); Youjun Xiong, Shenzhen (CN); Xianwen Zeng, Shenzhen (CN); Zhihao Zhang, Shenzhen (CN); Meihui Zhang, Shenzhen (CN); Chunyu Chen, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 239 days.

(21) Appl. No.: 18/052,535

(22) Filed: Nov. 3, 2022

(65) Prior Publication Data
US 2023/0158672 A1     May 25, 2023

(30) Foreign Application Priority Data
Nov. 16, 2021   (CN) .......................... 202111357777.X

(51) Int. Cl.
*G06F 17/00* (2019.01)
*B25J 9/16* (2006.01)

(52) U.S. Cl.
CPC ............. *B25J 9/1666* (2013.01); *B25J 9/163* (2013.01)

(58) Field of Classification Search
CPC ........ B25J 9/1666; B25J 9/163; B25J 9/1676; B25J 9/1602

USPC ........................................................ 700/255
See application file for complete search history.

(56) References Cited

U.S. PATENT DOCUMENTS

| | | | | |
|---|---|---|---|---|
| 8,774,968 B2* | 7/2014 | Kim | ....................... | B25J 9/1666 700/262 |
| 9,044,856 B2* | 6/2015 | Nagasaka | ............... | B25J 9/0087 |
| 9,539,726 B2* | 1/2017 | Simaan | .................. | A61B 34/35 |
| 10,081,107 B2* | 9/2018 | Sakabe | .................... | B25J 9/1697 |
| 10,252,420 B2* | 4/2019 | Carlisle | .................. | B25J 13/085 |
| 10,654,168 B2* | 5/2020 | Khripin | .................. | B25J 9/1664 |
| 11,426,875 B2* | 8/2022 | Khripin | ................ | B62D 57/032 |
| 11,660,752 B2* | 5/2023 | Whitman | ............. | G05D 1/0891 700/255 |
| 11,712,805 B2* | 8/2023 | Zhou | ...................... | B25J 9/1679 700/245 |

(Continued)

OTHER PUBLICATIONS

Obstacle Avoidance Algorithms for Autonomous Navigation system in Unstructured Indoor areas (Year: 2018).*

*Primary Examiner* — Ronnie M Mancho

(57) ABSTRACT

A robot obstacle avoidance method, a robot controller using the same, and a storage medium are provided. The method includes: determining an influence value of an obstacle on a motion range of a joint of the robot according to a position of the obstacle in a workspace of the robot; establishing a state transition relationship of the robot by taking a joint velocity of the robot as a control target and a joint angular velocity of the robot as a control input quantity; and avoiding the robot from colliding with the obstacle during a movement process of the robot by performing a model predictive control on the robot according to the state transition relationship and the influence value. In the present disclosure, the influence of the obstacle on the motion range of the joint of the robot is fully considered.

20 Claims, 7 Drawing Sheets

(56) References Cited

U.S. PATENT DOCUMENTS 11,911,916 B2 * 2/2024 Khripin ................. B25J 9/1694

* cited by examiner

ROBOT OBSTACLE AVOIDANCE METHOD, COMPUTER READABLE STORAGE MEDIUM, AND ROBOT

CROSS REFERENCE TO RELATED APPLICATIONS

The present disclosure claims priority to Chinese Patent Application No. 202111357777.X, filed Nov. 16, 2021, which is hereby incorporated by reference herein as if set forth in its entirety.

BACKGROUND

1. Technical Field

The present disclosure relates to robot technology, and particularly to a robot obstacle avoidance method, a computer readable storage medium, and a robot.

2. Description of Related Art

With the expansion of the application scope of robots, the working environment of the robots also become various. In the workspace of a robot, there are often various static or dynamic obstacles. If the obstacles are ignored, the robot will be very likely to collide with the obstacles, and the damage to the body of the robot or the obstacles will be caused. Although collisions can be predicted to a certain extent by dynamic monitoring the distance between the robot and its surrounding environment based on visual equipment, it will be difficult to ensure the completion of tasks of the robot while avoiding obstacles.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

Figure 1:
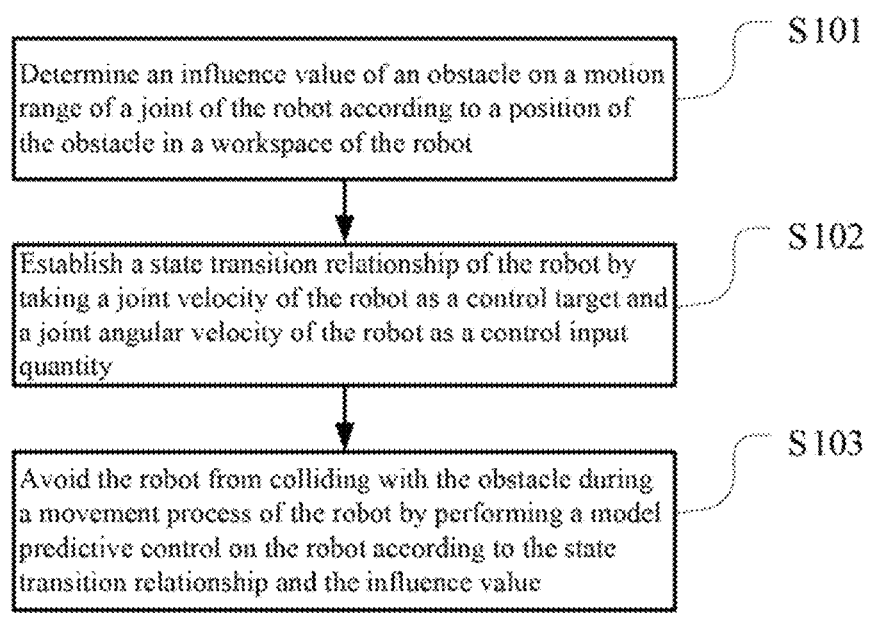
FIG. 1 is a flow chart of a robot obstacle avoidance method according to an embodiment of the present disclosure.

FIG. 1 is a flow chart of a robot obstacle avoidance method according to an embodiment of the present disclosure. In this embodiment, the robot obstacle avoidance method is a computer-implemented method executable for a processor of a robot (e.g., a robotic arm). In other embodiments, the method may be implemented through a robot obstacle avoidance apparatus shown in FIG. 6 or a robot shown in FIG. 7. As shown in FIG. 1, in this embodiment, the robot obstacle avoidance method may include the following steps.

S101: determining an influence value of an obstacle on a motion range (i.e., range of motion, which is the capability of the joint to go through its complete spectrum of movements) of a joint of the robot according to a position of the obstacle in a workspace (i.e., the set of all positions that (an end-effector of) the robot can reach) of the robot.

Figure 2:
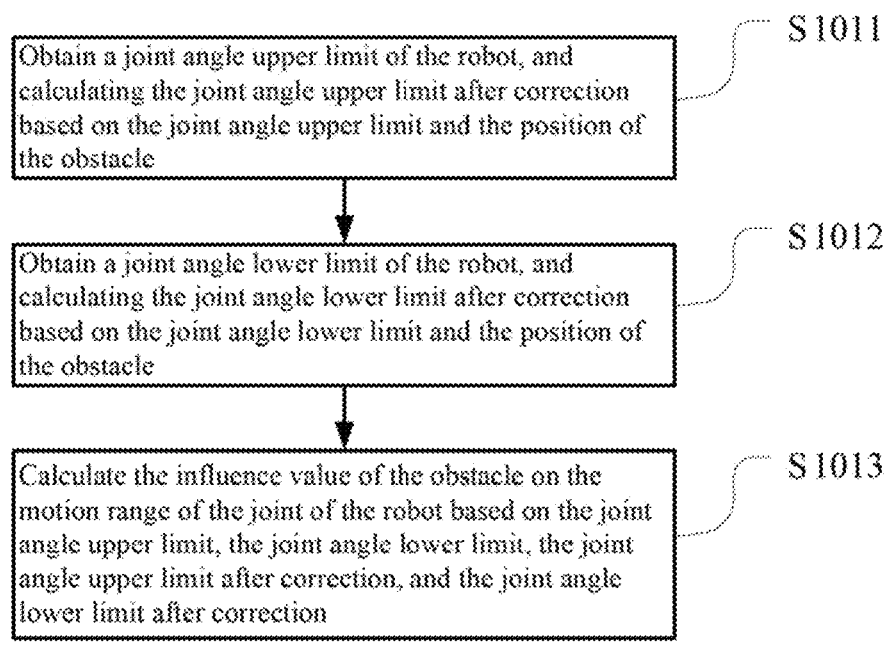
FIG. 2 is a flow chart of determining the influence value of the obstacle on the motion range of the joint of the robot according to the position of the obstacle in the workspace of the robot according to an embodiment of the present disclosure.

Generally, the robot includes a plurality of joints. In this embodiment, the serial number of a joint of the robot is denoted as j, $1 \leq j \leq n$, and n is the total number of the joints of the robot. FIG. 2 is a flow chart of determining the influence value of the obstacle on the motion range of the joint of the robot according to the position of the obstacle in the workspace of the robot according to an embodiment of the present disclosure. As shown in FIG. 2, taking the j-th joint of the robot (denoted as a current joint) as an example, step S101 may specifically include the following steps.

S1011: obtaining a joint angle upper limit of the robot, and calculating the joint angle upper limit after correction based on the joint angle upper limit and the position of the obstacle.

Generally, for the current joint of the robot, the joint angle upper limit (i.e., the upper limit of the joint angle of the current joint) is a known fixed value. In the workspace of the robot, the appearance of the obstacle restricts the movement of the robot, and accordingly restricts the motion range of each joint of the robot.

Figure 3:
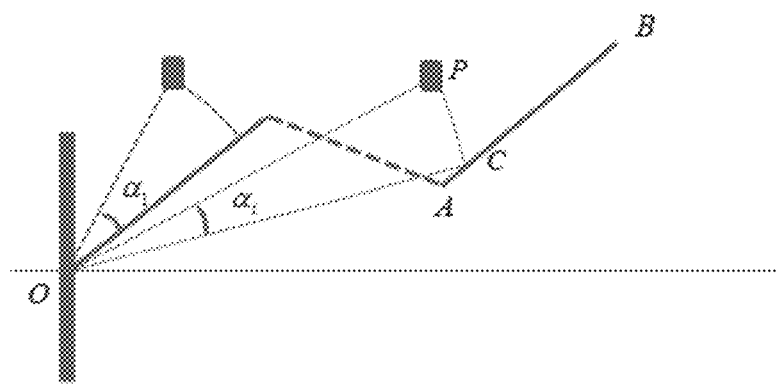
FIG. 3 is a schematic diagram of a joint angle constraint of the obstacle on the robot when the robot moves in a two-dimensional plane.

FIG. 3 is a schematic diagram of a joint angle constraint of the obstacle on the robot when the robot moves in a two-dimensional plane. If the robot just moves in the two-dimensional plane, the constraint imposed by the obstacle on the joint angle of the robot is as shown in FIG. 3. In which, O is the rotation axis of the joint, and P is the position of the obstacle. Assuming that all other joints of the robot has are locked in their existing positions and only the current joint is rotated, when a circle is drawn clockwise with O as the origin and OP as the radius, a certain link of the robot will intersect the obstacle at the point C after passing through the angle $\alpha_j^+$.

Figure 4:
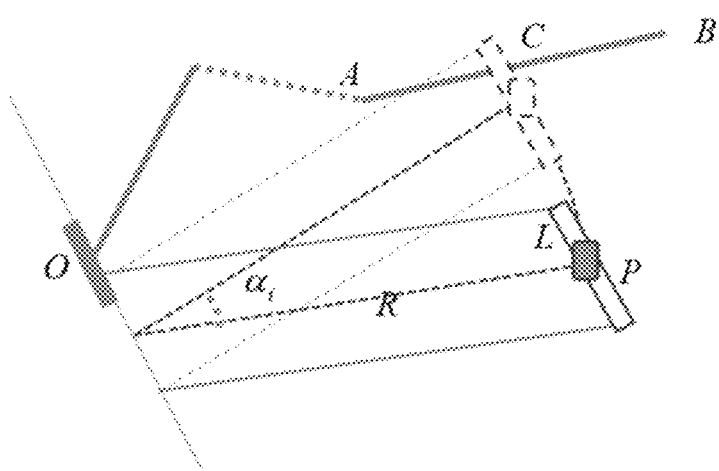
FIG. 4 is a schematic diagram of the joint angle constraint of the obstacle on the robot when the robot moves in a three-dimensional plane.

FIG. 4 is a schematic diagram of the joint angle constraint of the obstacle on the robot when the robot moves in a three-dimensional plane. Similarly, if the robot moves in the three-dimensional space, the constraint imposed by the obstacle on the joint angle of the robot is shown in FIG. 4. In which, O is the rotation axis of the joint, and P is the position of the obstacle. Assuming that all other joints of the robot has are locked in their existing positions and only the current joint is rotated, the vertical distance from P to the rotation axis O can be calculated as R. By taking the point P as the center and extending the line with the length of L that is parallel to the rotation axis O as the dilation area of the obstacle, when the line L is rotated clockwise with O as the rotation axis and R as the radius, the line L will intersect with a certain link of the robot at the point C after passing through the angle $\alpha_j^+$.

In particular, if there is no intersection point, it means that the current joint will not hit the obstacle when rotated, that is, the obstacle will not affect the motion range of the current joint. If there are KN obstacles, the clockwise rotational angle of a certain link of the robot when the link intersects each obstacle can be obtained according to the forgoing process. The above-mentioned clockwise rotational angle are recorded as $\alpha_{j,1}^+, \alpha_{j,2}^+, \ldots, \alpha_{j,kn}^+, \ldots,$ and $\alpha_{j,KN}^+$, respectively, where kn is the serial number of the obstacle, $1 \leq kn \leq KN$, $\alpha_{j,kn}^+$ is the clockwise rotational angle of a certain link of the robot when it intersects the kn-th obstacle, then the joint angle upper limit after correction can be calculated according to an equation of:

$$\theta_j^{max'} = \min(\theta_j^{max}, \theta_j^t + \min(\alpha_{j,1}^+, \alpha_{j,2}^+, \ldots, \alpha_{j,kn}^+, \ldots, \alpha_{j,KN}^+));$$

where, $\theta_j^{max}$ is the joint angle upper limit of the j-th joint of the robot, $\theta_j^t$ is an initial joint angle of the j-th joint (i.e., the initial angle of the j-th joint) of the robot, min is a function for calculating the minimum value, and $\theta_j^{max'}$ is the joint angle upper limit of the j-th joint of the robot after correction.

S1012: obtaining a joint angle lower limit of the robot, and calculating the joint angle lower limit after correction based on the joint angle lower limit and the position of the obstacle.

Generally, for the current joint of the robot, the joint angle lower limit is a known fixed value.

Similar to the process in step S1012, if the robot is only moved in the two-dimensional plane, by drawing a circle counterclockwise with O as the origin and OP as the radius, a link of the robot and the obstacle will intersect at the point C and after passing the angle $\alpha_j^-$; and if the robot is moved in the three-dimensional space, by taking O as the rotation axis and R as the radius to rotate the line L counterclockwise along the rotation axis O, the line L and a certain link of the robot will intersect at the point C after passing through the angle $\alpha_j^-$.

In particular, if there is no intersection point, it means that the current joint will not hit the obstacle when rotated, that is, the obstacle will not affect the motion range of the current joint. If there are KN obstacles, the counterclockwise rotational angle of a certain link of the robot when the link intersects each obstacle can be obtained according to the forgoing process. The above-mentioned counterclockwise rotational angle are recorded as $\alpha_{j,1}^-, \alpha_{j,2}^-, \ldots, \alpha_{j,kn}^-, \ldots,$ and $\alpha_{j,KN}^-$, respectively, where $\alpha_{j,kn}^-$ is the counterclockwise rotational angle of a certain link of the robot when it intersects the kn-th obstacle, then the joint angle lower limit after correction can be calculated according to an equation of:

$$\theta_j^{min'} = \min(\theta_j^{min}, \theta_j^t - \min(\alpha_{j,1}^-, \alpha_{j,2}^-, \ldots, \alpha_{j,kn}^-, \ldots, \alpha_{j,KN}^-));$$

where, $\theta_j^{min}$ is the joint angle lower limit of the j-th joint of the robot, and $\theta_j^{min'}$ is the joint angle lower limit of the j-th joint of the robot after correction.

S1013: calculating the influence value of the obstacle on the motion range of the joint of the robot based on the joint angle upper limit, the joint angle lower limit, the joint angle upper limit after correction, and the joint angle lower limit after correction.

In this embodiment, the influence of the obstacle on the motion range of the joint of the robot may be expressed as a normalized quadratic form, that is, the influence value of the obstacle on the motion range of the joint of the robot may be calculated based on an equation of:

$$\alpha_j = \left(1 - \frac{\theta_j^{max'} - \theta_j^{min'}}{\theta_j^{max} - \theta_j^{min}}\right)^2;$$

where, $\alpha_j$ is the influence value of the obstacle on the motion range of the j-th joint of the robot.

When there is no obstacle, the above-mentioned equation is $\alpha_j = 0$, that is, the obstacle has no effect on the motion range of the joint.

The influence of obstacles on the motion range of all the joints may be expressed as an equation of:

$$\sum_{j=1}^{n} \alpha_j = \sum_{j=1}^{n} \left(1 - \frac{\theta_j^{max'} - \theta_j^{min'}}{\theta_j^{max} - \theta_j^{min}}\right)^2.$$

It is easy to understand that during the movement of the robot, it is expected that the influence of obstacles on the movement of the robot should be as small as possible.

S102: establishing a state transition relationship of the robot by taking a joint velocity of the robot as a control target and a joint angular velocity of the robot as a control input quantity.

Model predictive control (MPC) is to predict the system state in the subsequent duration from the current moment according to the current system state and the future input, and optimize the future control input quantity to make the future system state reach the expected value.

In this embodiment, a trajectory tracking control may be performed on the robot using a nonlinear model predictive control method in Cartesian space coordinates. By taking the joint velocity of the robot as the control target and the joint angular velocity of the robot as the control input quantity, the constraint of the motion of the robot may be expressed as an equation of:

$$\dot{x}=J(\theta)\dot{\theta};$$

where, $\dot{x}$ is the joint velocity of the robot, $J(\theta)$ is the Jacobian matrix, and $\dot{\theta}$ is the joint angular velocity of the robot.

It can be written in discrete form as an equation of:

$$\dot{x}(k)=J(\theta(k))\dot{\theta}(k);$$

Let $X(k)=[x(k); \theta(k)]$, $u(k)=\dot{\theta}(k)$, the forging equation can be organized into an equation of:

$$\dot{X}(k)=f(X(k),u(k));$$

where f is a nonlinear function of state and input.

In this embodiment, if the state quantity of the robot in a predetermined duration (denoted as $T_s$) from the current moment is predicted, and the number of prediction steps is N, that is, there are N control time points in total, then the prediction step size will be $T=T_s/N$.

The variable rate of the state quantity is processed using an equation of:

$$\dot{X}(k) \approx \frac{X(k+1) - X(k)}{T};$$

then it can get an equation of:

$$X(k+1)=X(k)+T \cdot f(X(k),u(k))=F(X(k),u(k));$$

where, F is the state transition relationship of the robot.

S103: avoiding the robot from colliding with the obstacle during a movement process of the robot by performing a model predictive control on the robot according to the state transition relationship and the influence value.

Figure 5:
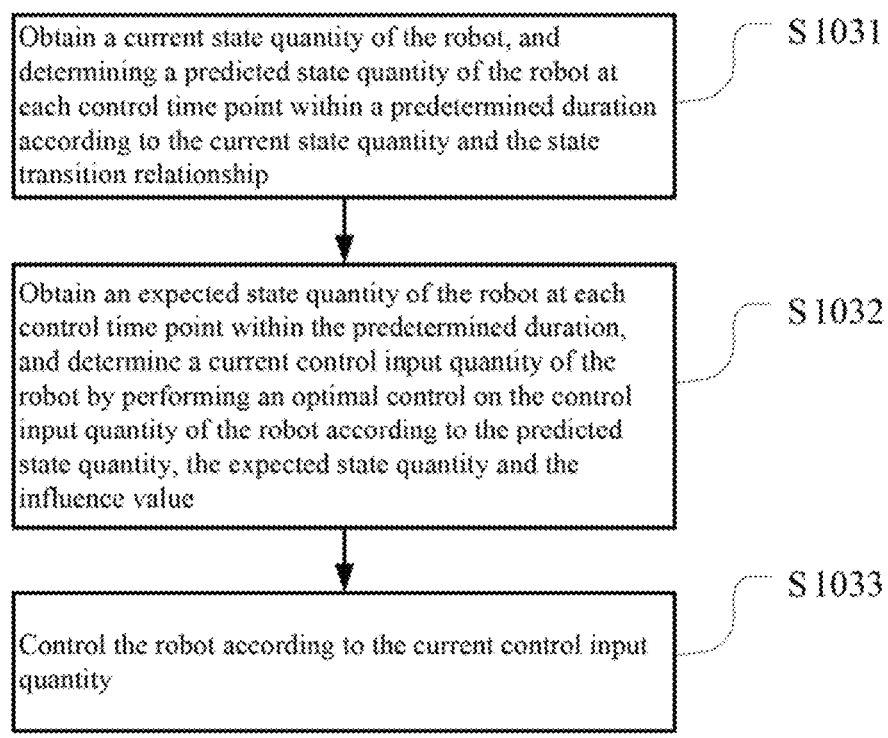
FIG. 5 is a flow chart of performing the model predictive control on the robot according to the state transition relationship and the influence value according to an embodiment of the present disclosure.

FIG. 5 is a flow chart of performing the model predictive control on the robot according to the state transition relationship and the influence value according to an embodiment of the present disclosure. As shown in FIG. 5, step S103 may specifically include the following steps.

S1031: obtaining a current state quantity of the robot, and determining a predicted state quantity of the robot at each control time point within a predetermined duration according to the current state quantity and the state transition relationship.

In this embodiment, the predicted state quantity of the robot at each control time point within the predetermined duration may be determined based on equations of:

$$X(k+1) = F(X(k), u(k))$$

$$X(k+2) = F(X(k+1), u(k+1)) = F(F(X(k), u(k)), u(k+1))$$

$$\ldots$$

$$X(k+i) = F(X(k+i-1), u(k+i-1)) = F(F^{(\ldots)}_{\ldots}F(X(k), u(k)), u(k+i-1));$$

$$\ldots$$

$$X(k+N) = F(X(k+N-1), u(k+N-1)) = F(F^{(\ldots)}_{\ldots}F(X(k), u(k)), u(k+N-1))$$

where, i is a serial number of each control time point within the predetermined duration, $0 \leq i \leq N$, N is the total number of the control time points within the predetermined duration, u(k+i) is the control input quantity of the robot at the i-th control time point within the predetermined duration, X(k) is the current state quantity, and X(k+i) is the predicted state quantity of the robot at the i-th control time point within the predetermined duration.

S1032: obtaining an expected state quantity of the robot at each control time point within the predetermined duration, and determining a current control input quantity of the robot by performing an optimal control (i.e., a control that finds a control system under a given constraint so as to obtain the maximum or minimum values of the performance index of a given controlled system) on the control input quantity of the robot according to the predicted state quantity, the expected state quantity and the influence value.

In this embodiment, the expected state quantity may be obtained by planning the path of the robot, which is taken as a known quantity here. When the influence of obstacles is not considered, in order to realize the tracking control of the expected state quantity, the following control objective function of the robot may be built based on the predicted state quantity and the expected state quantity:

$$\sum_{i=0}^{N} \|y_d(k+i) - X(k+i)\|_2 + \sum_{i=0}^{N-1} \|u(k+i)\|_2;$$

where, $y_d(k+i)$ is the expected state quantity of the robot at the i-th control time point within the predetermined duration.

Taking the minimization of the control objective function as the optimization objective, a nonlinear programming solving may be performed on the control input quantity based on equations of:

$$\min \sum_{i=0}^{N} \|y_d(k+i) - X(k+i)\|_2 + \sum_{i=0}^{N-1} \|u(k+i)\|_2$$

s.t.

$$X(k+i) = F(F^{(\ldots)}_{\ldots}F(X(k), u(k)), u(k+N-1))$$

$$\dot{\theta}_{min} < u(k+i) < \dot{\theta}_{max}$$

$$\theta_j^{min} < X(k+i) < \theta_j^{max};$$

where, $\dot{\theta}_{min}$ is a preset lower limit of the joint angular velocity, and $\dot{\theta}_{max}$ is a preset upper limit of the joint angular velocity.

When considering the influence of obstacles, in order to realize the tracking control of the expected state quantity, the control objective function of the robot as shown below may be built based on the predicted state quantity, the expected state quantity, and the influence value:

$$\sum_{i=0}^{N}\|y_d(k+i)-X(k+i)\|_2 + \sum_{i=0}^{N-1}\|u(k+i)\|_2 + \sum_{i=0}^{N}\sum_{j=1}^{n}\alpha_j;$$

Taking the minimization of the control objective function as the optimization objective, the nonlinear programming solving may be performed on the control input quantity based on equations of:

$$\min \sum_{i=0}^{N}\|y_d(k+i)-X(k+i)\|_2 + \sum_{i=0}^{N-1}\|u(k+i)\|_2 \sum_{i=0}^{N}\sum_{j=1}^{n}\alpha_j$$

s.t.

$$X(k+i) = F(F_{i-1}...F(X(k), u(k)), u(k+N-1))$$

$$\dot{\theta}_{min} < u(k+i) < \dot{\theta}_{max}$$

$$\theta_j^{min'} < X(k+i) < \theta_j^{max'}.$$

Through the forging process of nonlinear programming solving, the control input quantity of the robot at each control time point within the predetermined duration may be obtained, and the first control input quantity at a first control time point within the predetermined duration is determined as the current control input quantity of the robot.

S1033: controlling the robot according to the current control input quantity.

That is, the joint angular velocity of the robot is adjusted according to the current control input quantity, then the optimization solving is performed recursively according to steps S1031-S1033 at each control time point, so as to realize the optimal control of the whole process.

To sum up, in this embodiment, it determines an influence value of an obstacle on a motion range of a joint of the robot according to a position of the obstacle in a workspace of the robot; establishes a state transition relationship of the robot by taking a joint velocity of the robot as a control target and a joint angular velocity of the robot as a control input quantity; and avoids the robot from colliding with the obstacle during a movement process of the robot by performing a model predictive control on the robot according to the state transition relationship and the influence value. In this embodiment, the influence of the obstacle on the motion range of the joint of the robot is fully considered, and an obstacle avoidance control is performed in advance while predicting the future state of the robot through model predictive control, which can ensure the completion of the task while avoiding obstacles.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 6:
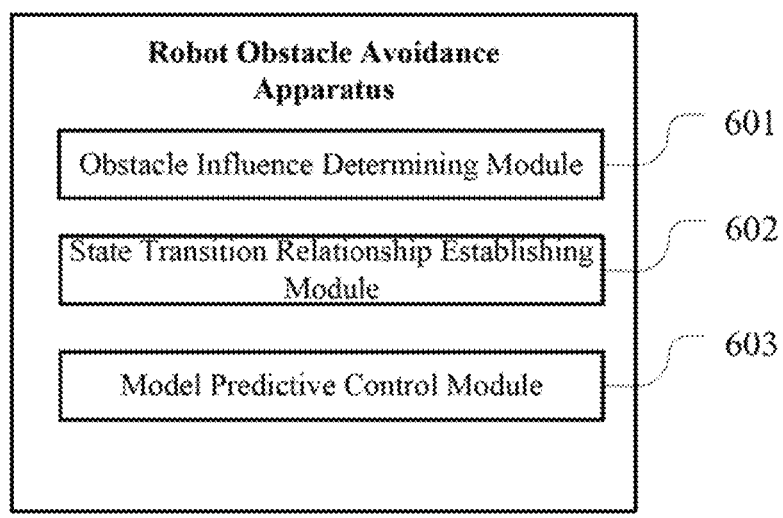
FIG. 6 is a schematic block diagram of the structure of a robot obstacle avoidance apparatus according to an embodiment of the present disclosure.

FIG. 6 is a schematic block diagram of the structure of a robot obstacle avoidance apparatus according to an embodiment of the present disclosure, which corresponds to the robot obstacle avoidance method described in the above-mentioned embodiment.

In this embodiment, the robot obstacle avoidance apparatus may include:

an obstacle influence determining module 601 configured to determine an influence value of an obstacle on a motion range of a joint of the robot according to a position of the obstacle in a workspace of the robot;

a state transition relationship establishing module 602 configured to establish a state transition relationship of the robot by taking a joint velocity of the robot as a control target and a joint angular velocity of the robot as a control input quantity; and a model predictive control module 603 configured to avoid the robot from colliding with the obstacle during a movement process of the robot by performing a model predictive control on the robot according to the state transition relationship and the influence value.

In one embodiment, the model predictive control module 603 may specifically include:

a predicted state quantity determining unit configured to obtain a current state quantity of the robot, and determine a predicted state quantity of the robot at each control time point within a predetermined duration according to the current state quantity and the state transition relationship;

an optimal control unit configured to obtain an expected state quantity of the robot at each control time point within the predetermined duration, and determine a current control input quantity of the robot by performing an optimal control on the control input quantity of the robot according to the predicted state quantity, the expected state quantity and the influence value; and a robot control unit configured to control the robot according to the current control input quantity.

In one embodiment, the predicted state quantity determining unit may be specifically configured to determine the predicted state quantity of the robot at each control time point within the predetermined duration based on an equation of:

$$X(k+i)=F(X(k+i-1),u(k+i-1))=F(\underset{i-1\uparrow}{F(...F}(X(k),u(k)),u(k+i-1))$$

where, i is a serial number of each control time point within the predetermined duration, 0≤i≤N, N is the total number of the control time points within the predetermined duration, F is the state transition relationship, u(k+i) is the control input quantity of the robot at the i-th control time point within the predetermined duration, X(k) is the current state quantity, and X(k+i) is the predicted state quantity of the robot at the i-th control time point within the predetermined duration.

In one embodiment, the optimal control unit may specifically include:

a control objective function constructing unit configured to build a control objective function of the robot based on the predicted state quantity, the expected state quantity, and the influence value;

a nonlinear programming solving unit configured to obtain a first control input quantity of the robot at each control time point within the predetermined duration by taking minimizing the control objective function as an optimization goal to perform a nonlinear programming solving on the control input quantity after the optimal control is performed; and a current control input quantity determining unit configured to determine the first control input quantity at a first control time point within the predetermined duration as the current control input quantity of the robot.

In one embodiment, the control objective function constructing unit may be specifically configured to build the control objective function as an equation of:

$$\sum_{i=0}^{N}\|y_d(k+i)-X(k+i)\|_2 + \sum_{i=0}^{N-1}\|u(k+i)\|_2 + \sum_{i=0}^{N}\sum_{j=1}^{n}\alpha_j;$$

where, $y_d(k+i)$ is the expected state quantity of the robot at the i-th control time point within the predetermined duration, j is a joint serial number of the robot, $1 \leq j \leq n$, n is the total number of joints of the robot, and $\alpha_j$ is the influence value of the obstacle on the motion range of the j-th joint of the robot.

In one embodiment, the obstacle influence determining module 601 may specifically include:

a joint angle upper limit correcting unit configured to obtain a joint angle upper limit of the robot, and calculating the joint angle upper limit after correction based on the joint angle upper limit and the position of the obstacle;

a joint angle lower limit correcting unit configured to obtain a joint angle lower limit of the robot, and calculating the joint angle lower limit after correction based on the joint angle lower limit and the position of the obstacle; and an obstacle influence value calculating unit configured to calculate the influence value of the obstacle on the motion range of the joint of the robot based on the joint angle upper limit, the joint angle lower limit, the joint angle upper limit after correction, and the joint angle lower limit after correction.

In one embodiment, the obstacle influence value calculating unit may be specifically configured to calculate the influence value of the obstacle on the motion range of the joint of the robot based on an equation of:

$$\alpha_j = \left(1 - \frac{\theta_j^{max'} - \theta_j^{min'}}{\theta_j^{max} - \theta_j^{min}}\right)^2;$$

where, j is a joint serial number of the robot, $1 \leq j \leq n$, n is the total number of joints of the robot, $\theta_j^{max}$ is the joint angle upper limit of the j-th joint of the robot, $\theta_j^{min}$ is the joint angle lower limit of the j-th joint of the robot, $\theta_j^{max'}$ is the joint angle upper limit after correction of the j-th joint of the robot, $\theta_j^{min'}$ is the joint angle lower limit after correction of the j-th joint of the robot, $\alpha_j$ is the influence value of the obstacle on the motion range of the j-th joint of the robot.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 7:
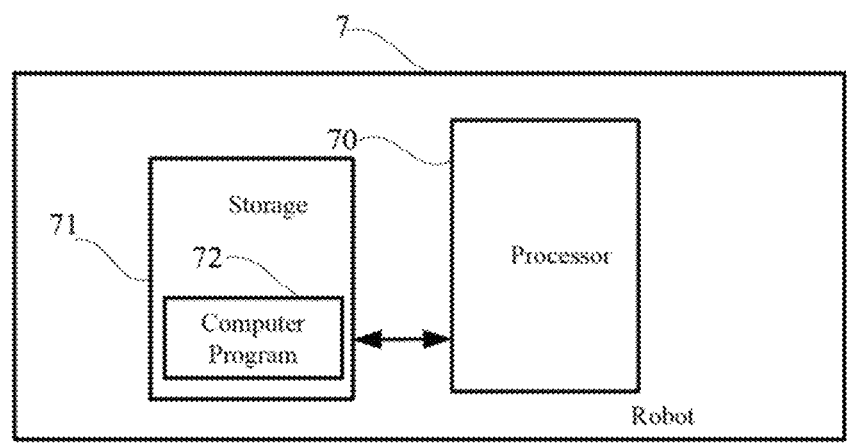
FIG. 7 is a schematic block diagram of a robot according to an embodiment of the present disclosure.

FIG. 7 is a schematic block diagram of a robot according to an embodiment of the present disclosure. For convenience of description, only parts related to this embodiment are shown.

As shown in FIG. 7, in this embodiment, the robot 7 includes a processor 70, a storage 71, and a computer program 72 stored in the storage 71 and executable on the processor 70. When executing (instructions in) the computer program 72, the processor 70 implements the steps in the above-mentioned embodiments of the robot obstacle avoidance method, for example, steps S101-S103 shown in FIG. 1. Alternatively, when the processor 70 executes the (instructions in) computer program 72, the functions of each module/unit in the above-mentioned device embodiments, for example, the functions of the modules 601-603 shown in FIG. 6 are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7.

It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented obstacle avoidance method for a robot, comprising:
    determining an influence value of an obstacle on a motion range of a joint of the robot according to a position of the obstacle in a workspace of the robot;
    establishing a state transition relationship of the robot by taking a joint velocity of the robot as a control target and a joint angular velocity of the robot as a control input quantity; and
    avoiding the robot from colliding with the obstacle during a movement process of the robot by performing a model predictive control on the robot according to the state transition relationship and the influence value.

2. The method of claim 1, wherein the performing the model predictive control on the robot according to the state transition relationship and the influence value comprises:
    obtaining a current state quantity of the robot, and determining a predicted state quantity of the robot at each control time point within a predetermined duration according to the current state quantity and the state transition relationship;
    obtaining an expected state quantity of the robot at each control time point within the predetermined duration, and determining a current control input quantity of the robot by performing an optimal control on the control input quantity of the robot according to the predicted state quantity, the expected state quantity and the influence value; and
    controlling the robot according to the current control input quantity.

3. The method of claim 2, wherein the determining the predicted state quantity of the robot at each control time point within the predetermined duration according to the current state quantity and the state transition relationship comprises:
    determining the predicted state quantity of the robot at each control time point within the predetermined duration based on an equation of:

$$X(k+i)=F(X(k+i-1),u(k+i-1))=F(\overset{F(...F}{_{i-1\uparrow}}(X(k),u(k)),u(k+i-1))$$

where, i is a serial number of each control time point within the predetermined duration, $0 \leq i \leq N$, N is the total number of the control time points within the predetermined duration, F is the state transition relationship, u(k+i) is the control input quantity of the robot at the i-th control time point within the predetermined duration, X(k) is the current state quantity, and X(k+i) is the predicted state quantity of the robot at the i-th control time point within the predetermined duration.

4. The method of claim 3, wherein the determining the current control input quantity of the robot by performing the optimal control on the control input quantity of the robot according to the predicted state quantity, the expected state quantity and the influence value comprises:
building a control objective function of the robot based on the predicted state quantity, the expected state quantity, and the influence value;
obtaining a first control input quantity of the robot at each control time point within the predetermined duration by taking minimizing the control objective function as an optimization goal to perform a nonlinear programming solving on the control input quantity after the optimal control is performed; and
determining the first control input quantity at a first control time point within the predetermined duration as the current control input quantity of the robot.

5. The method of claim 4, wherein the building the control objective function of the robot based on the predicted state quantity, the expected state quantity, and the influence value comprises:
building the control objective function as an equation of:

$$\sum_{i=0}^{N}\|y_d(k+i)-X(k+i)\|_2 + \sum_{i=0}^{N-1}\|u(k+i)\|_2 + \sum_{i=0}^{N}\sum_{j=1}^{n}\alpha_j;$$

where, $y_d(k+i)$ is the expected state quantity of the robot at the i-th control time point within the predetermined duration, j is a joint serial number of the robot, $1 \leq j \leq n$, n is the total number of joints of the robot, and $\alpha_j$ is the influence value of the obstacle on the motion range of the j-th joint of the robot.

6. The method of claim 1, wherein the determining the influence value of an obstacle on the motion range of the joint of the robot according to the position of the obstacle in the workspace of the robot comprises:
obtaining a joint angle upper limit of the robot, and calculating the joint angle upper limit after correction based on the joint angle upper limit and the position of the obstacle;
obtaining a joint angle lower limit of the robot, and calculating the joint angle lower limit after correction based on the joint angle lower limit and the position of the obstacle; and
calculating the influence value of the obstacle on the motion range of the joint of the robot based on the joint angle upper limit, the joint angle lower limit, the joint angle upper limit after correction, and the joint angle lower limit after correction.

7. The method of claim 6, wherein the calculating the influence value of the obstacle on the motion range of the joint of the robot based on the joint angle upper limit, the joint angle lower limit, the joint angle upper limit after correction, and the joint angle lower limit after correction comprises:
calculating the influence value of the obstacle on the motion range of the joint of the robot based on an equation of:

$$\alpha_j = \left(1 - \frac{\theta_j^{max'} - \theta_j^{min'}}{\theta_j^{max} - \theta_j^{min}}\right)^2;$$

where, j is a joint serial number of the robot, $1 \leq j \leq n$, n is the total number of joints of the robot, $\theta_j^{max}$ is the joint angle upper limit of the j-th joint of the robot, $\theta_j^{min}$ is the joint angle lower limit of the j-th joint of the robot, $\theta_j^{max'}$ is the joint angle upper limit after correction of the j-th joint of the robot, $\theta_j^{min'}$ is the joint angle lower limit after correction of the j-th joint of the robot, $\alpha_j$ is the influence value of the obstacle on the motion range of the j-th joint of the robot.

8. A non-transitory computer readable storage medium for storing one or more computer programs, wherein the one or more computer programs comprise:
instructions for determining an influence value of an obstacle on a motion range of a joint of a robot according to a position of the obstacle in a workspace of the robot;
instructions for establishing a state transition relationship of the robot by taking a joint velocity of the robot as a control target and a joint angular velocity of the robot as a control input quantity; and
instructions for avoiding the robot from colliding with the obstacle during a movement process of the robot by performing a model predictive control on the robot according to the state transition relationship and the influence value.

9. The storage medium of claim 8, the instructions for performing the model predictive control on the robot according to the state transition relationship and the influence value comprise:
instructions for obtaining a current state quantity of the robot, and determining a predicted state quantity of the robot at each control time point within a predetermined duration according to the current state quantity and the state transition relationship;
instructions for obtaining an expected state quantity of the robot at each control time point within the predetermined duration, and determining a current control input quantity of the robot by performing an optimal control on the control input quantity of the robot according to the predicted state quantity, the expected state quantity and the influence value; and
instructions for controlling the robot according to the current control input quantity.

10. The storage medium of claim 9, wherein the instructions for determining the predicted state quantity of the robot at each control time point within the predetermined duration according to the current state quantity and the state transition relationship comprise:
instructions for determining the predicted state quantity of the robot at each control time point within the predetermined duration based on an equation of:

$$X(k+i)=F(X(k+i-1),u(k+i-1))=F(\underbrace{F(...F}_{i-1\uparrow}(X(k),u(k)),u(k+i-1))$$

where, i is a serial number of each control time point within the predetermined duration, $\theta j \leq N$, N is the total number of the control time points within the predetermined duration, F is the state transition relationship, u(k+i) is the control input quantity of the robot at the i-th control time point within the predetermined duration, X(k) is the current state quantity, and X(k+i) is the predicted state quantity of the robot at the i-th control time point within the predetermined duration.

11. The storage medium of claim 10, wherein the instructions for determining the current control input quantity of the robot by performing the optimal control on the control input quantity of the robot according to the predicted state quantity, the expected state quantity and the influence value comprise:
  instructions for building a control objective function of the robot based on the predicted state quantity, the expected state quantity, and the influence value;
  instructions for obtaining a first control input quantity of the robot at each control time point within the predetermined duration by taking minimizing the control objective function as an optimization goal to perform a nonlinear programming solving on the control input quantity after the optimal control is performed; and
  instructions for determining the first control input quantity at a first control time point within the predetermined duration as the current control input quantity of the robot.

12. The storage medium of claim 11, wherein the instructions for building the control objective function of the robot based on the predicted state quantity, the expected state quantity, and the influence value comprise:
  instructions for building the control objective function as an equation of:

$$\sum_{i=0}^{N}\|y_d(k+i)-X(k+i)\|_2 + \sum_{i=0}^{N-1}\|u(k+i)\|_2 + \sum_{i=0}^{N}\sum_{j=1}^{n}\alpha_j;$$

where, $y_d(k+i)$ is the expected state quantity of the robot at the i-th control time point within the predetermined duration, j is a joint serial number of the robot, $1 \leq j \leq n$, n is the total number of joints of the robot, and $x_j$ is the influence value of the obstacle on the motion range of the j-th joint of the robot.

13. The storage medium of claim 8, wherein the instructions for determining the influence value of an obstacle on the motion range of the joint of the robot according to the position of the obstacle in the workspace of the robot comprise:
  instructions for obtaining a joint angle upper limit of the robot, and calculating the joint angle upper limit after correction based on the joint angle upper limit and the position of the obstacle;
  instructions for obtaining a joint angle lower limit of the robot, and calculating the joint angle lower limit after correction based on the joint angle lower limit and the position of the obstacle; and
  instructions for calculating the influence value of the obstacle on the motion range of the joint of the robot based on the joint angle upper limit, the joint angle lower limit, the joint angle upper limit after correction, and the joint angle lower limit after correction.

14. A robot, comprising:
  a processor;
  a memory coupled to the processor; and
  one or more computer programs stored in the memory and executable on the processor;
  wherein, the one or more computer programs comprise:
  instructions for determining an influence value of an obstacle on a motion range of a joint of the robot according to a position of the obstacle in a workspace of the robot;
  instructions for establishing a state transition relationship of the robot by taking a joint velocity of the robot as a control target and a joint angular velocity of the robot as a control input quantity; and
  instructions for avoiding the robot from colliding with the obstacle during a movement process of the robot by performing a model predictive control on the robot according to the state transition relationship and the influence value.

15. The robot of claim 14, the instructions for performing the model predictive control on the robot according to the state transition relationship and the influence value comprise:
  instructions for obtaining a current state quantity of the robot, and determining a predicted state quantity of the robot at each control time point within a predetermined duration according to the current state quantity and the state transition relationship;
  instructions for obtaining an expected state quantity of the robot at each control time point within the predetermined duration, and determining a current control input quantity of the robot by performing an optimal control on the control input quantity of the robot according to the predicted state quantity, the expected state quantity and the influence value; and
  instructions for controlling the robot according to the current control input quantity.

16. The robot of claim 15, wherein the instructions for determining the predicted state quantity of the robot at each control time point within the predetermined duration according to the current state quantity and the state transition relationship comprise:
  instructions for determining the predicted state quantity of the robot at each control time point within the predetermined duration based on an equation of:

$$X(k+i)=F(X(k+i-1),u(k+i-1))=F(\underset{i-1\uparrow}{F(...F}(X(k),u(k)),u(k+i-1))$$

where, i is a serial number of each control time point within the predetermined duration, $\theta j \leq N$, N is the total number of the control time points within the predetermined duration, F is the state transition relationship, $u(k+i)$ is the control input quantity of the robot at the i-th control time point within the predetermined duration, $X(k)$ is the current state quantity, and $X(k+i)$ is the predicted state quantity of the robot at the i-th control time point within the predetermined duration.

17. The robot of claim 16, wherein the instructions for determining the current control input quantity of the robot by performing the optimal control on the control input quantity of the robot according to the predicted state quantity, the expected state quantity and the influence value comprise:
  instructions for building a control objective function of the robot based on the predicted state quantity, the expected state quantity, and the influence value;
  instructions for obtaining a first control input quantity of the robot at each control time point within the predetermined duration by taking minimizing the control objective function as an optimization goal to perform a nonlinear programming solving on the control input quantity after the optimal control is performed; and
  instructions for determining the first control input quantity at a first control time point within the predetermined duration as the current control input quantity of the robot.

18. The robot of claim 17, wherein the instructions for building the control objective function of the robot based on the predicted state quantity, the expected state quantity, and the influence value comprise:

instructions for building the control objective function as an equation of:

$$\sum_{i=0}^{N}\|y_d(k+i)-X(k+i)\|_2 + \sum_{i=0}^{N-1}\|u(k+i)\|_2 + \sum_{i=0}^{N}\sum_{j=1}^{n}\alpha_j;$$

where, $y_d(k+i)$ is the expected state quantity of the robot at the i-th control time point within the predetermined duration, j is a joint serial number of the robot, $1 \leq j \leq n$, n is the total number of joints of the robot, and $\alpha_j$ is the influence value of the obstacle on the motion range of the j-th joint of the robot.

19. The robot of claim 14, wherein the instructions for determining the influence value of an obstacle on the motion range of the joint of the robot according to the position of the obstacle in the workspace of the robot comprise:

instructions for obtaining a joint angle upper limit of the robot, and calculating the joint angle upper limit after correction based on the joint angle upper limit and the position of the obstacle;

instructions for obtaining a joint angle lower limit of the robot, and calculating the joint angle lower limit after correction based on the joint angle lower limit and the position of the obstacle; and instructions for calculating the influence value of the obstacle on the motion range of the joint of the robot based on the joint angle upper limit, the joint angle lower limit, the joint angle upper limit after correction, and the joint angle lower limit after correction.

20. The robot of claim 19, wherein the instructions for calculating the influence value of the obstacle on the motion range of the joint of the robot based on the joint angle upper limit, the joint angle lower limit, the joint angle upper limit after correction, and the joint angle lower limit after correction comprise:

instructions for calculating the influence value of the obstacle on the motion range of the joint of the robot based on an equation of:

$$\alpha_j = \left(1 - \frac{\theta_j^{max'} - \theta_j^{min'}}{\theta_j^{max} - \theta_j^{min}}\right)^2;$$

where, j is a joint serial number of the robot, $1 \leq j \leq n$, n is the total number of joints of the robot, $\theta_j^{max}$ is the joint angle upper limit of the j-th joint of the robot, $\theta_j^{min}$ is the joint angle lower limit of the j-th joint of the robot, $\theta_j^{max'}$ is the joint angle upper limit after correction of the j-th joint of the robot, $\theta_j^{min'}$ is the joint angle lower limit after correction of the j-th joint of the robot, $\alpha_j$ is the influence value of the obstacle on the motion range of the j-th joint of the robot.

* * * * *